United States Patent [19]

Braun et al.

[11] Patent Number: 4,827,287

[45] Date of Patent: May 2, 1989

[54] CONTINUOUS INK JET PRINTER HAVING IMPROVED STIMULATION WAVEGUIDE CONSTRUCTION

[75] Inventors: Hilarion Braun, Xenia; Ralph E. Antolik, III, Huber Heights, both of Ohio

[73] Assignee: Eastman Kodak Company, Rochester, N.Y.

[21] Appl. No.: 229,534

[22] Filed: Aug. 8, 1988

[51] Int. Cl.[4] ..................... G01D 15/18; B21D 53/00; C25D 1/02; B05D 5/12

[52] U.S. Cl. ................................ 346/75; 346/140 R; 29/157 C; 204/9; 204/11; 204/14.1; 204/18.1; 427/102; 427/103; 427/402; 427/404

[58] Field of Search ................ 346/75, 140 R; 204/9, 204/11, 14.1, 17, 18.1; 427/102, 103, 402, 404; 29/157 C

[56] References Cited

U.S. PATENT DOCUMENTS

| | | | |
|---|---|---|---|
| 3,882,508 | 5/1975 | Stoneburner | 346/75 |
| 4,110,759 | 8/1978 | Stoneburner | 346/75 |
| 4,651,174 | 3/1987 | Baua et al. | 346/140 R |

*Primary Examiner*—E. A. Goldberg
*Assistant Examiner*—Gerald E. Preston
*Attorney, Agent, or Firm*—John D. Husser

[57] ABSTRACT

An orifice plate assembly for use in continuous ink jet printers includes a linear orifice plate having formed therein at least one linear array of orifices extending from a first end region to a second end region. The orifice plate has a main body portion which tapers gradually in thickness (t) along the length of the plate from the first end region to the second end region. The orifice plate is mounted so as to have an effective width (w) which tapers from the first to second end region. The relation t÷w remains approximately constant along its length dimension.

13 Claims, 3 Drawing Sheets

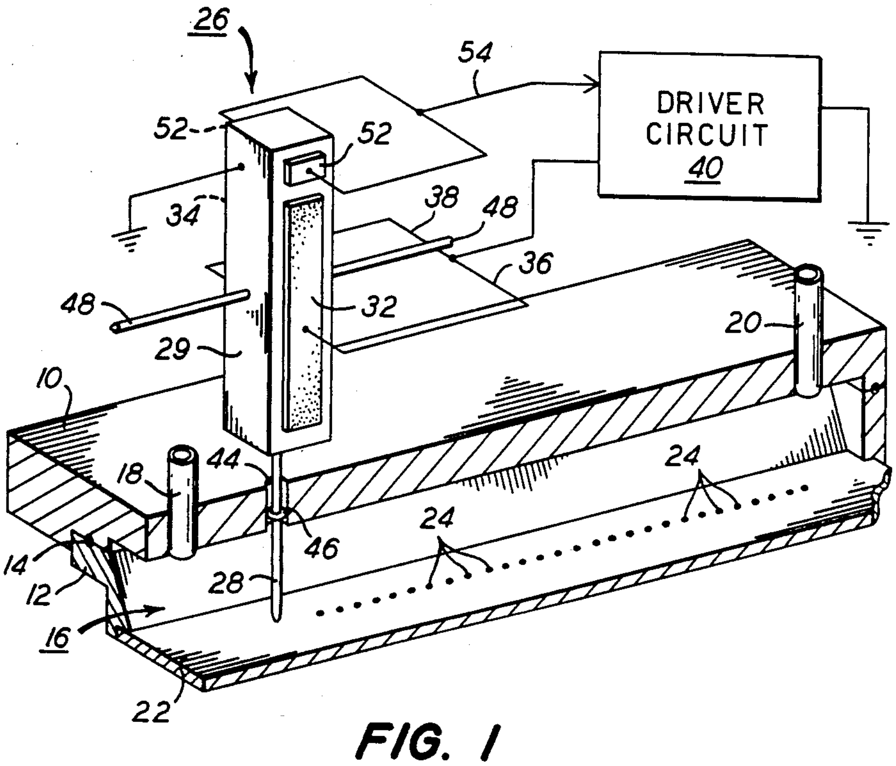
FIG. 1
FIG. 5
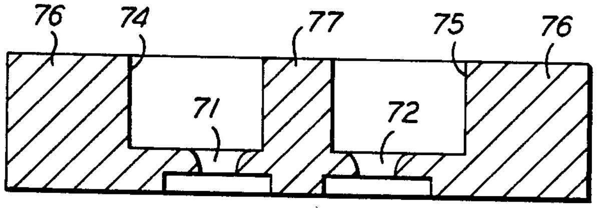
FIG. 6
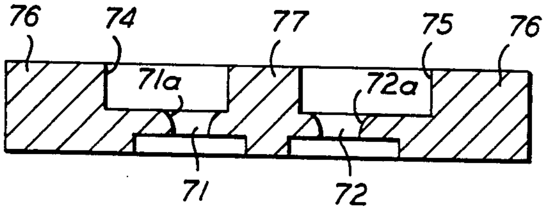

CONTINUOUS INK JET PRINTER HAVING IMPROVED STIMULATION WAVEGUIDE CONSTRUCTION

FIELD OF THE INVENTION

The present invention relates to continuous ink jet printer constructions for stimulating the controlled formation of ink droplet streams and more particularly to orifice plate/waveguide systems that provide improved amplitude uniformity of traveling wave stimulation energy.

BACKGROUND OF INVENTION

In continuous ink jet printers of the type employing a plurality of drop streams, the natural tendency for ink streams (issuing from an array of orifices) to break up into droplets is synchronized by imposing waveform energy of a preselected frequency (one that provides a wavelength over a break-up threshold). This forms streams of uniformly spaced ink droplets which can be selectively charged at the break-up point of the ink stream filament and then deflected to a catch (or print) trajectory.

One problem in attaining high quality continuous ink jet printing is to assure (in addition to uniform drop size and spacing) that the drop break-up points of all jet streams occur within a given charging "window," i.e. a length range that extends along the drop stream path past the charge electrodes array. In forming ink jet arrays of substantial lengths, e.g. 6 inches or more, a number of problems evolve in attempting to achieve break-up of all jet streams within the charge window. First, the preferred mode of stimulation for long arrays is by traveling wave vibration of the orifice plate, which in itself introduces variations in the drop break-off point along the array length. Second, the traveling wave is reduced in amplitude as it moves from the point of vibrating contact (usually at one end of the orifice array) along the length of the orifice plate. A lower amplitude in the wave at a given orifice causes the ink stream filament (between that orifice and its break-up point) to lengthen. Third, reflected or second order vibration waves can cause additional non-uniformity, e.g. resulting in cuspings of break-off points along the length of the orifice array.

U.S. Pat. No. 3,882,508 provides good additional explanation about the second and third above-mentioned difficulties in achieving break-off point uniformity. The disclosure of the U.S. Pat. No. 3,882,508 also teaches that the reduction of wave amplitude along the length of the orifice array can be decreased by tapering the width of the effective vibrational area of the orifice plate, from a wider dimension at the point of vibration application to a narrower dimension at the opposite end of the orifice plate. To minimize reflected wave action, acoustic dampers can be provided at the ends of the orifice arrays (see the U.S. Pat. No. 3,882,508 disclosure) or a sharply narrowed width can be constructed at the end of the effective vibrational area of the orifice plate (see U.S. Pat. No. 4,110,759).

While the foregoing techniques are highly useful, they have not functioned well at longer array lengths (e.g., over 10.5"); and there are various applications where wider printing array capabilities would be highly useful (e.g. in newspaper printing, computer output printing and magazine signature printing).

SUMMARY OF INVENTION

A significant purpose of the present invention is to provide in continuous ink jet printers improved orifice plate/waveguide constructions for enabling traveling wave stimulation. One important advantage of the present invention is to enable ink jet stimulation with operably uniform waves, of effective stimulating amplitude, over longer array lengths than was previously possible. Another important advantage of constructions in accord with the invention is their capability to suppress asymmetric vibrational modes, while allowing application of vibrations of amplitude adequate for proper stimulation of long ink jet arrays.

Thus in one aspect the present invention constitutes in continuous ink jet printer apparatus, an improved ink droplet stimulation system comprising: (i) a linear orifice plate having at least one linear array of orifices, extending from a first end region to a second end region, and a main body portion which tapers gradually in thickness along the length of the plate from the first end region to the second end region; (ii) a waveguide member constructed to support the orifice plate with its orifices in communication with a manifold chamber, and to constrain the periphery of the orifice plate to define an effective vibration area which tapers gradually in width from the first end region to the second end region; and (iii) means for imparting vibration energy to the orifice plate proximate the first end region.

In other aspects the present invention constitutes improved orifice plate constructions for use in such printer stimulation system and improved fabrication methods for forming such an orifice plate.

BRIEF DESCRIPTION OF THE DRAWINGS

The subsequent descriptions of preferred embodiments of the invention refer to the accompanying drawings wherein:

FIG. 1 is a perspective view, partially in section of a prior art continuous ink jet printer stimulation system of the kind on which the present invention improves;

FIG. 5 is a cross-sectional view taken along the line V—V of FIG. 3;

FIG. 6 is a cross-sectional view taken along the line VI—VI of FIG. 3.

DETAILED DESCRIPTION OF PREFERRED EMBODIMENTS

Figure 2:
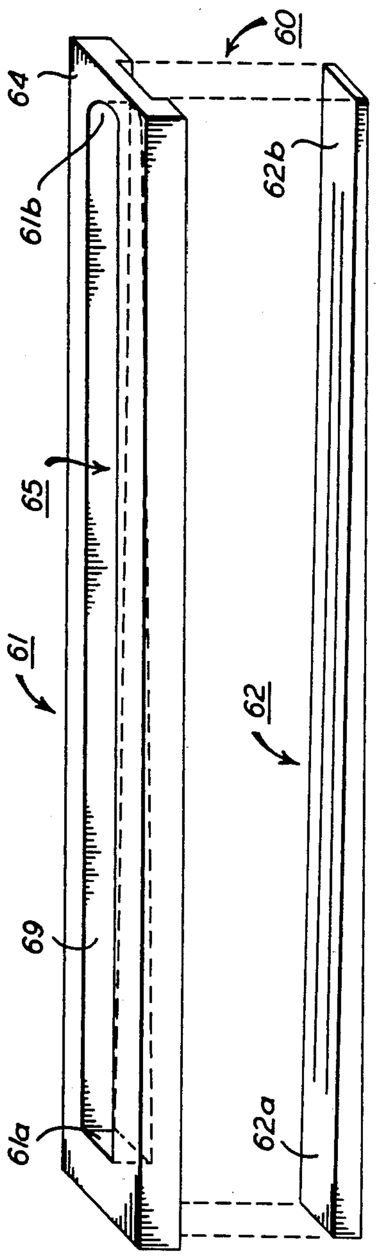
FIG. 2 is an exploded perspective view of the orifice plate and wave guiding support of a preferred stimulation system embodiment in accord with the present invention.
Figure 3:
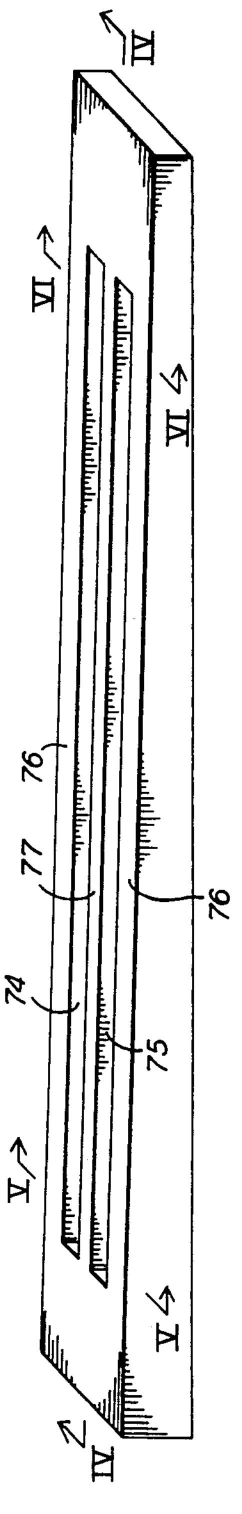
FIG. 3 is an enlarged perspective view of the orifice plate embodiment of FIG. 2.

FIG. 1 shows the upper portion of a prior art print head assembly of the kind in which the present invention can be usefully employed. The lower portion of the print head assembly (not shown) typically comprises: (i) an array(s) of droplet charging electrodes disposed closely below the orifice plate 22 and adjacent the ink streams that issue from orifices 24 and (ii) a catcher assembly for receiving non-print drops (usually charged ones) from the droplet streams.

In general, the upper portion of the print head assembly comprises orifice plate 22, support and waveguide member 12, upper manifold wall 10 and vibrator assembly 26. As shown, the components 22, 12 and 10 cooperate to define a manifold reservoir 16 in to which ink is supplied, through inlet 18, and can flow out of, through an ink return outlet 20.

The plate 22 is formed of a metal material and is sufficiently thin to be somewhat flexible. Orifice plate 22 is bonded to the element 12, for example by solder or by an adhesive, such that it defines one wall of the reservoir 16. Orifice plate 22 has formed therein a plurality of orifices 24 which are arranged in at least one row. The orifices communicate with the reservoir 16 so that ink in the reservoir 16 can flow through the orifices 24 and emerge as ink filaments.

The vibrator assembly 26 includes a resonant body portion 29 and a thin metal pin member 28, e.g. of the kind described in more detail in U.S. Pat. No. 4,646,104. The end 30 of pin member 28 is reduced in diameter and rounded so that it contacts the orifice plate 22 substantially at a point. As is known, such point contact on the center line of the orifice plate 22 insures that bending waves of a first order are generated in the orifice plate 22.

The vibrator assembly 26 further includes piezoelectric crystal means, comprising piezoelectric crystals 32 and 34, which are mounted on opposite sides of body 29. The crystals 32 and 34 each include a thin, electrically conductive layer on their outer surfaces to which conductors 36 and 38 are electrically connected. The inner surfaces of the crystals are in electrical contact with and are grounded by the body portion 29. The crystals 32 and 34 are configured such that they tend to compress or extend in a direction parallel to the axis of elongation of the body portion 29 and pin member 28 when a fluctuating electrical potential is placed across the crystals. As a consequence, when an A.C. electrical drive signal is applied to lines 36 and 38 by driver circuit means 40, the crystals 32 and 34 produce acoustic waves in the rod 28. The circuit 40 supplies an electrical drive signal at preselected frequency f, with feedback from piezoelectric crystal 52.

The pin member 28 extends into the manifold means through an opening 44 in wall 10 and contacts the orifice plate 22 inside the reservoir 16. A seal, such as O-ring 46 is provided between pin member 28 and wall 10. Tapered pins 48 which engage generally conical detents in the sides of body portion 29 provide a mounting which restricts movement of the body portion 29 vertically.

Referring now to FIG. 2, there is shown one preferred embodiment of a stimulation sub-system 60 (orifice plate 62 and orifice plate support and waveguide member 61) which can cooperate with vibrator assembly 26 in accord with the present invention. One skilled in the art will readily understand that the sub-system 60 shown in FIG. 2 can be substituted into a FIG. 1-type upper print head assembly, e.g. with support/waveguide member 61 replacing portion 12 of the FIG. 1 assembly and orifice plate 62 replacing portion 22 of the FIG. 1 assembly. Thus, a top wall such as shown at 10 in FIG. 1 attaches in sealed relation to the top surface 64 of member 61 and orifice plate 62 attaches as shown by the dotted lines to form an ink manifold chamber in the volume indicated as 65 in FIG. 2.

Figure 4:
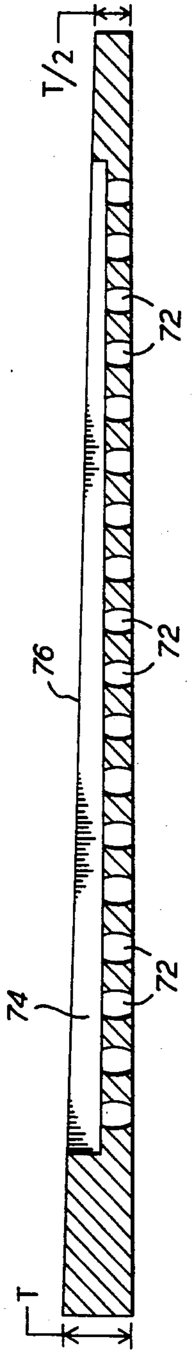
FIG. 4 is a cross-sectional view taken along the line IV—IV of FIG. 3.

Referring now to FIGS. 3–7, the unique construction of the orifice plate member 62 is shown in more detail. Thus, in accord with the present invention, the orifice plate member 62 is formed with a thickness that varies along its length dimension (the orifice array direction), e.g. tapering gradually from a thickness T at one end to a thickness T/2 at the other end. In the preferred embodiment shown in FIGS. 3–7, the orifice plate comprises two linear arrays of orifices 71 and 72, with slot recesses 74, 75 formed thereover in a central portion of the plate member. The main body portion 76 thus has a thicker cross section than the central portion in which the orifices are formed. If desired, a central separator portion 77 can be formed to separate a pair of orifice arrays. As shown in FIG. 4, the portion of the orifice plate below the slots 74, 75, in which the orifices are formed, is preferably of uniform thickness; and the main body portions 76 above the orifice-forming portions vary in height to provide the desired thickness taper of the overall orifice plate.

One preferred method for fabricating an orifice plate (such as shown in FIGS. 3–7) in accord with the present invention, is a variation of the method described in U.S. Pat. No. 4,184,925. More particularly, pegs of cylindrical photoresist material conforming to the desired orifice main diameter are first formed in linear arrays on a steel substrate. Next, that substrate is plated with metal, e.g. by nickel electroplating, to build up the lower portions of the orifice plate. Preferably, electroplating is continued to an extent that the metal begins to overlay the photoresist peg tops (in the manner shown in FIG. 5 at 71*a*, 72*a* and described in more detail in the U.S. Pat. No. 4,184,925 disclosure) to determine the exact diameter of the orifices accurately. Next, photoresist patterns for slot portions 74, 75 are formed over the plated orifice tops and the plating is resumed to build up the remaining thickness of the orifice plate. In accord with an aspect of the present invention, the orifice plate member is withdrawn from the plating solution gradually in its lengthwise direction to achieve the desired thickness taper (e.g. T to T/2) along its length. In some instances it is useful to also vary the plating current amplitude during the withdrawal stage. The photoresist portions are then removed to provide the orifice plate of configuration shown in FIGS. 3–6.

After fabrication as described above, the orifice plate 62 is attached to the waveguide support member 61, e.g. by solder or adhesive, along the edges of the walls 69 that define the manifold interior. As shown best in FIG. 7, the walls 69 are also selectively configured, tapering from a wider spacing at one end 69*a* to a narrower spacing at the other end 69*b*. By virtue of the attachment between walls 69 and the orifice plate top, the effective vibrational area of the orifice plate thus tapers in width from end 62*a* to 62*b*.

Figure 7:
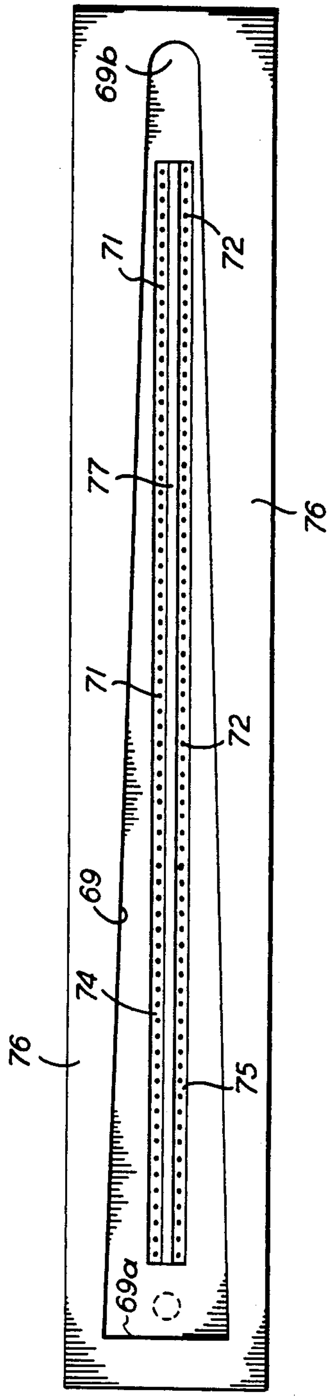
FIG. 7 is a top view of the assembled elements of FIG. 2.

Before discussing exemplary details of preferred constructions for effecting the present invention, a brief discussion of the physical operation of a construction such as just described will be helpful. Thus, when the thicker end 62*a* of the orifice plate 62 is mated to the wider end 62*b* of the support/waveguide member 61, as shown in FIGS. 2 and 7, several beneficial physical effects are achieved. First, the wider effective vibrational regions of the orifice plate are thicker so that asymmetric wave modes are suppressed. Second, at the narrower effective vibrational regions, where asymmetric mode suppression is not necessary, the orifice plate is thinner so that the desired longitudinal traveling wave amplitudes are not so severely attenuated as in prior art configurations. Viewed in another way, the orifice plate thickness taper maintains a nominal stiffness while the effective vibrational area is narrowed in width, along the desired wave propagation direction. These effects have been found to enable significantly longer orifice arrays to be successfully utilized in continuous ink jet printing.

As in the case of prior art width tapering, the optimum amount of thickness tapering is a function of many variables, e.g. the composition of the orifice plate and the utilized stimulation frequency. Thus, visual observation of a particular system is a good way to optimize tapers. However, U.S. Pats. Nos. 3,882,508 and 4,110,759 describe useful preliminary design guidelines about useful amounts of width taper, e.g. a taper ratio of 0.025 cm per 1.0 cm of orifice plate length has been found useful. With respect to thickness taper, in accord with the present invention we have found that once a desired width taper is selected, useful thickness taper can be calculated from our observation that traveling wave frequency (and wavelength) remain constant (i.e. is not dispersed along a long waveguide) if the thickness and width of the waveguide comply along its longitudinal dimension with the relation: $t \div w = a$ constant, where t is waveguide thickness and w is the effective waveguide width.

A useful first approximation for selecting widths and thickness for waveguides according to the present invention is to find, for a selected traveling wave frequency, the second mode cut-off width and thickness and to use those values for the end of the guide that is to be contacted by the stimulator. The width and thickness of other guide portions are then reduced linearly, complying with the relation $t \div w$ remains a constant. This produces an almost nondispersive waveguide and one that suppresses transmission of the second mode vibrations, so long as the ratio $t(x) \div w(x)$ does not drop to a value appropriate for the second mode.

In one specific example using an electroplating formed nickel orifice plate such as shown in FIGS. 3–7, a 15" length orifice plate was constructed to taper in thickness from about 16 mils at the thickest end to about 8 mils at the thinnest end. The waveguide attachment was formed and attached to the orifice plate to give effective vibrational widths of 0.4" at the widest end (corresponding to the thickest end) and 0.16" at the narrowest end (corresponding to the thinnest end). This allowed the formation of an orifice array of 14" length which was operated successfully at a stimulation frequency of 50 kHz with a 30% stimulation window. In this example the stimulation window (W) was calculated according to the relation:

$$W = \frac{OD - UD}{(OD + UD) \div 2}$$

where the overdrive amplitude OD is the stimulation vibration amplitude of minimum filament length and the underdrive amplitude UD is the vibration amplitude of first drop satellite occurrence.

The invention has been described in detail with particular reference to preferred embodiments thereof, but it will be understood that variations and modifications can be effected within the spirit and scope of the invention.

We claim:

1. In continuous ink jet printer apparatus of the kind having means defining a print head ink manifold chamber and means for supplying ink under pressure into said manifold chamber, an improved ink droplet stimulation system comprising:

(a) a linear orifice plate having formed therein at least one linear array of orifices extending from a first end region to a second end region, said orifice plate having a main body portion which tapers gradually in thickness along the length of said plate from said first end region to said second end region;

(b) a waveguide member constructed to support the main body portion of said orifice plate with said orifices in communication with said manifold chamber, said waveguide member constraining the periphery of said orifice plate to define an effective vibration area which tapers gradually in width from said first end region to said second end region; and (c) means for imparting vibration energy to said orifice plate proximate said first end region.

2. The invention defined in claim 1 wherein said width and thickness tapers comply approximately with the relation $t \div w$ is constant along the length dimension of said plate.

3. The invention defined in claim 1 wherein said orifice plate has a recessed central portion which defines said linear array of orifices, said central orifice plate portion having thickness less than that of said main body orifice plate portion at said second end region.

4. The invention defined in claim 3 wherein the thickness of said central orifice plate portion is substantially uniform along said orifice array length.

5. The invention defined in claim 4 wherein said central orifice plate portion of substantially uniform thickness is substantially parallel to the orifice outlet side of said orifice plate and said taper in thickness of said main body orifice plate portion is formed on the inlet side of said orifice plate.

6. An orifice plate member for use in continuous ink jet printers comprising a linear orifice plate having formed therein at least one linear array of orifices extending from a first end region to a second end region, said orifice plate having a main body portion which tapers gradually in thickness along the length of said plate from said first end region to said second end region.

7. The invention defined in claim 6 wherein said orifice plate has a recessed central portion which defines said linear array of orifices, said central orifice plate portion having thickness less than that of said main body orifice plate portion at said second end region.

8. The invention defined in claim 7 wherein the thickness of said central orifice plate portion is substantially uniform along said orifice array length.

9. The invention defined in claim 8 wherein said central orifice plate portion of substantially uniform thickness is substantially parallel to the orifice outlet side of said orifice plate and said taper in thickness of said main body orifice plate portion is formed on the inlet side of said orifice plate.

10. The invention defined in claim 6 wherein said orifice plate has an effective width (w) and thickness (t) relation such that $t \div w$ remains approximately constant along its length dimension.

11. A method for fabricating an orifice plate for use in continuous ink jet printers, said method comprising:

(a) forming a linear array of resist pegs of orifice size on a substrate;

(b) plating said substrate around said pegs to form an orifice array portion;

(c) forming a resist pattern over said orifice array portion;

(d) plating around said resist pattern to form an increased thickness peripheral portion around said orifice array portion; and (e) gradually terminating plating of said increased thickness portion from one end region of said orifice array to its other end region so as to cause said peripheral portion to taper in thickness from a first end region to a second end region.

12. The invention defined in claim 11 wherein such gradual plating termination is effected by progressive longitudinal withdrawal of said substrate.

13. The invention defined in claim 12 wherein plating rate is varied during such substrate withdrawal.

* * * * *